March 31, 1942. F. H. OSBORNE ET AL 2,277,934
SELECTOR MECHANISM FOR AUTOMATIC PHONOGRAPHS
Filed July 22, 1939 2 Sheets-Sheet 1
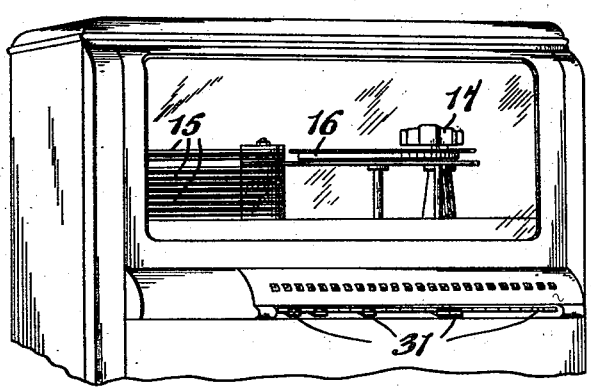
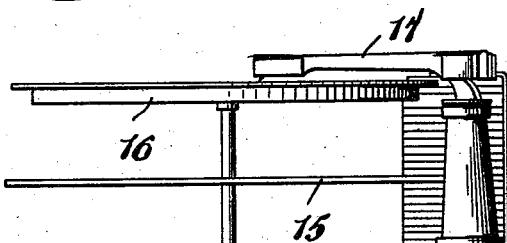
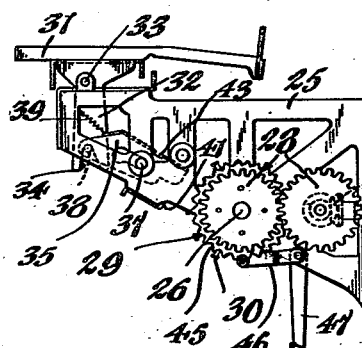
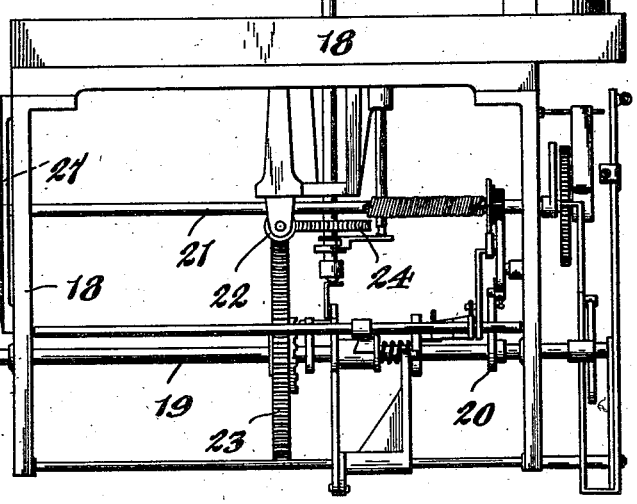
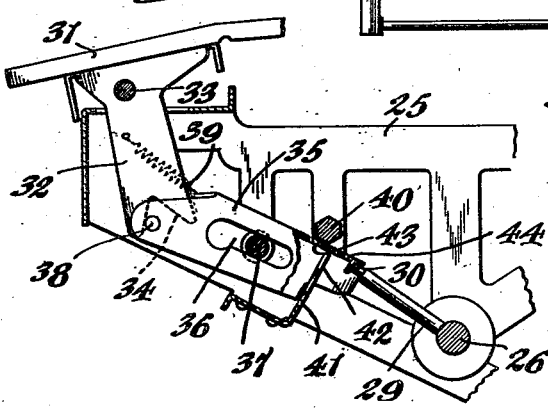
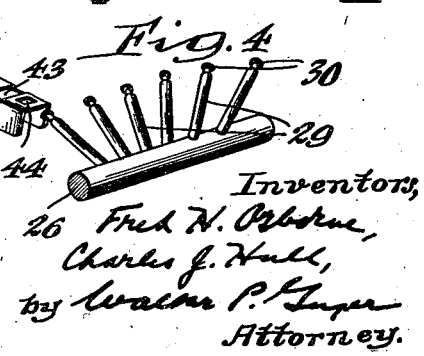
Inventors,
Fred N. Osborne,
Charles J. Hall,
by Walter P. Super
Attorney.

March 31, 1942. F. H. OSBORNE ET AL 2,277,934
SELECTOR MECHANISM FOR AUTOMATIC PHONOGRAPHS
Filed July 22, 1939 2 Sheets-Sheet 2
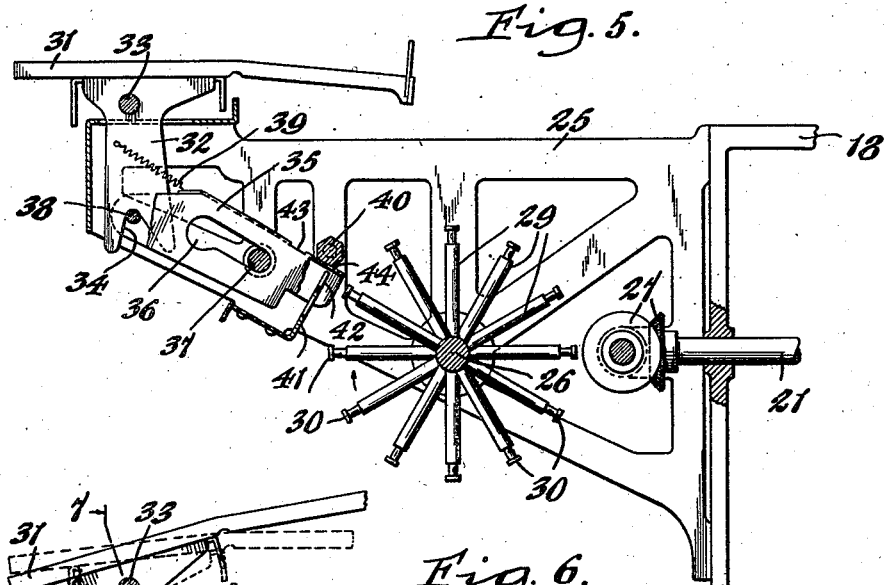
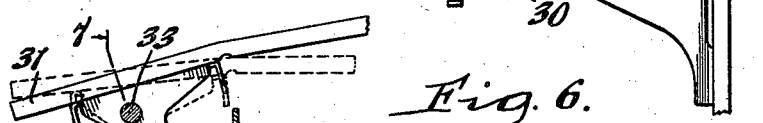
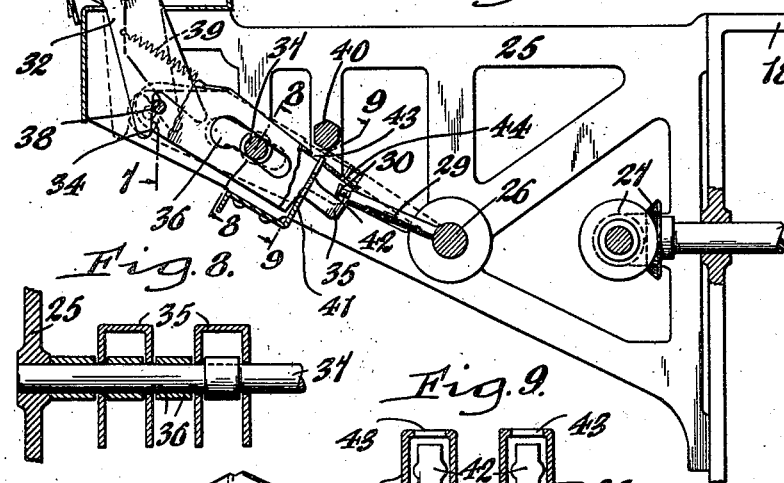
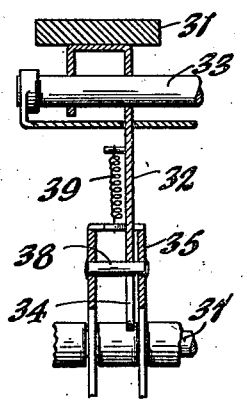
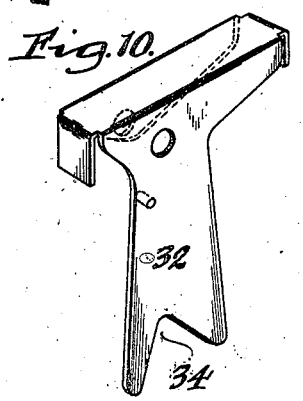
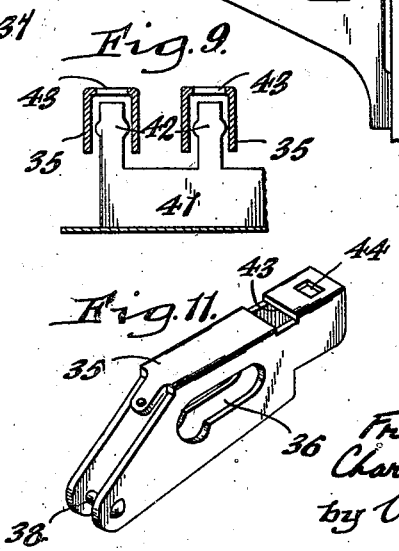
Inventors,
Fred H. Osborne,
Charles G. Hull,
by Walter P. Geyer
Attorney.

Patented Mar. 31, 1942

2,277,934

UNITED STATES PATENT OFFICE 2,277,934

SELECTOR MECHANISM FOR AUTOMATIC PHONOGRAPHS

Fred H. Osborne, Snyder, and Charles J. Hull, North Tonawanda, N. Y., assignors to The Rudolph Wurlitzer Company, North Tonawanda, N. Y., a corporation of Ohio Application July 22, 1939, Serial No. 286,032

12 Claims. (Cl. 192—139)

This invention relates generally to selective automatic phonographs but more particularly to a novel selector mechanism therefor.

One of its objects is to provide a selector mechanism of this character having a piano type keyboard which is so designed as to enable the ready and convenient selection of the records as well as their cancellation when desired.

Another object of the invention is the provision of a simple and efficient selector mechanism for multi-selective phonographs which is positive and reliable in operation and which assures accurate selection.

Other features of the invention reside in the construction and arrangement of parts hereinafter described and particularly pointed out in the appended claims.

In the accompanying drawings:

Figure 1 is a fragmentary perspective view of an automatic phonograph showing our improved selector mechanism thereon. Figure 2 is a side view of the selector mechanism in operative association with the phonograph chassis. Figure 3 is an enlarged fragmentary cross-section of the selector mechanism showing one of the key-selectors in its selective position. Figure 4 is a fragmentary perspective view of the selector shaft and selector arms and an associated selector-key pawl. Figure 5 is an enlarged fragmentary cross section of the selector mechanism showing one of the key-selectors in its non-selective position. Figure 6 is a similar view showing the position of one of the key-selectors and its associated parts just prior to a complete selective-setting position. Figures 7, 8 and 9 are fragmentary vertical longitudinal sections taken on the correspondingly-numbered lines in Figure 6. Figure 10 is a perspective view of one of the selector-key levers. Figure 11 is a like view of one of the selector pawls.

Similar characters of reference indicate corresponding parts throughout the several views.

Our keyboard selector assembly has been shown, by way of example, in connection with a multi-selective phonograph of the type disclosed in the Wilcox Patent No. 2,002,236, dated May 21, 1935, and wherein the phonograph, in general, includes a plurality of record-trays or carriers 15 disposed in stack-like fashion at one side of a vertically-movable turntable 16 for movement to an operative or play position over the turntable in response to the actuation of the selector mechanism. When a carrier is selectively projected for playing its record, the turntable is elevated to lift the record supported by the selected carrier into cooperating relation with the needle of the reproducer 17. After the playing of the record, the turntable is lowered to restore the played record to its carrier, the latter is then swung back into the carrier-stack, and the reproducer is swung to its initial position.

The record changer mechanism for controlling the movements of the turntable, record-carriers and reproducer form no part of the present invention, but are mounted upon a chassis 18 and include a cam shaft 19 having cams thereon for controlling the various parts of such mechanism in proper sequence all as disclosed in said Wilcox patent. One of these cams, that indicated by the numeral 20, is operatively connected to a selector shaft 21 to transmit motion thereto during the selecting cycle of the phonograph, and which shaft is governed in its selective movements by our keyboard selector assembly to in turn govern the selective projection of those carriers bearing the records selected at the keyboard. Motion is transmitted to the cam shaft by a suitable clutch mechanism from a worm 22 and worm wheel 23 and the turntable is driven from that same worm by a worm wheel 24, as shown in Figure 2.

The keyboard selector assembly is constructed as follows:

Secured to and projecting forwardly from the front side of the chassis 18 are end brackets 25 in which a counter selector shaft 26 is journaled, the same being driven from the main selective shaft 21 by a set of bevel gears 27 and a set of spur gears 28. This counter selector shaft has a plurality of radial elements or pins 29 projecting therefrom in spiral-like fashion axially of the shaft, the pins being disposed in equi-spaced relation lengthwise of the shaft and being in different radial planes. These pins correspond in number to the records borne by the phonograph and serve in conjunction with other means to stop the rotation of the selector shaft at the proper selector-governing positions. At their outer or free ends these pins are notched to provide heads 30.

Disposed above the plane of the brackets 25 and exposed at the front side of the phonograph cabinet for ready manipulation by the patrons, is a row of depressible selector keys 31 which, in appearance, simulate a piano keyboard and which correspond in number to the records borne by the phonograph and are in transverse alinement with the respective shaft-pins 29. Each of these keys is adapted to be tilted about a horizontal axis to and from a selective governing position and for this purpose each is mounted on the upper end of a vertically-swinging lever 32 pivoted intermediate its ends on a common pivot shaft 33 and shaped at its lower end to provide a fork or bifurcation 34. Arranged in a longitudinal row between and in line with the respective selector shaft-pins 29 and the key-supported levers 32 are companion pawls 35 which are adapted to be selectively projected by the companion keys 31 into a selective position into the path of travel of the companion selector shaft-pins so as to arrest the rotation of such shaft at the position required for bringing the record selected into play position. Each of these pawls is preferably of channel shape in cross section and intermediate its ends its side walls are provided with alining longitudinal slots 36 through which extend a common pivot shaft 37 fixed at its ends in the brackets 25. By this form of mounting each pawl is adapted to both pivot about the shaft 37 and move longitudinally relative thereto toward and from the opposing ends of the selector shaft-pins 29 and into and out of a selective governing position. The actuation of these pawls in a forward or selective-governing position is effected by the companion key-controlled levers 32 and to this end the forked end 34 of each lever straddles a cross pin 38 secured to the outer end of the pawl. A spring 39 connected to each pawl constantly urges it to move outwardly or in non-selective position and it also tends to swing the pawl about the pivot shaft 37 into abutting engagement with a horizontal stop rod 40 disposed between the end brackets 25 and common to the several pawls.

Means are provided for latching each of the pawls in its key-selected position and for this purpose a latch plate 41 is secured to the lower edges of the end brackets 25 and below the front portions of the pawls and is provided with a plurality of upstanding latching tongues 42, one for each pawl. Each of these tongues projects into the channel-way of the companion pawl forwardly of the pivot shaft 37 and its upper end is adapted to engage an opening 43 in the top side of the pawl when the latter is projected forwardly to a selective position, as shown by full lines in Figure 6. In the retracted or non-selective position of each pawl, its opening 43 is out of register with the companion latching tongue, as shown in Figure 5. By this construction, when a patron depresses a selector key 31 the companion pawl 35 is projected forwardly and tilted slightly downwardly at its front end about the pivot shaft 37 and its opening 43 is brought into register with the companion latching tongue 42 to thereby latch the pawl in its projected selected position shown by full lines in Figure 6. In this position the forward end of the pawl is in the path of the companion selector shaft-pin 29 so that when such pin is presented to this pawl it acts to rock the pawl upwardly from the full line to the dotted line position shown in Figure 6 or to the full line position shown in Figure 3. In this position the pawl is released from engagement with its companion latching tongue 42 and substantially simultaneously with such release the head 30 of the registering pin is engaged with a companion opening 44 provided in the pawl forwardly of the companion latch-receiving opening 43. Thus, as the shaft-pin 29 raises the companion selective-positioned pawl to the unlatched position shown in Figure 3, the spring 39 retracts the pawl 35 to bring its opening 43 out of latching register with the tongue 42 and present its other opening 44 into registering interlocking engagement with the head 30 of such pin, thereby latching the pawl in such position against the resistance of the spring 39.

After a given selector shaft-pin 29 has contacted a selected or projected pawl 35 to selectively initiate the mechanisms for bringing the corresponding record carrier 15 out over the turntable to position its record for play, a receding or backing-up movement is imparted to the selector shaft 26 to move the coupled shaft-pin out of contact with the latched pawl and withdraw the pin-head 30 from the latch-opening 44. Thereupon the spring 39 automatically returns the pawl to its initial non-selecting position and rocks the selector key 31 to its initial non-selecting position. This receding action may be imparted to the shaft 26 by a toothed wheel 45 mounted on the latter and an actuating pawl 46 operatively connected to a rock arm 47 engaged at its free end with a cam 48 fixed on the cam shaft 19. Thus, at a predetermined time in the selecting cycle, motion is transmitted by the cam 48 to the pawl 46 to in turn rotate the selector shaft 26, by a wedging-like action between the pawl and the contacted tooth-face, a fraction of a revolution in a direction sufficient to withdraw the latched pin 29 from the projected pawl 35, and permit the latter to automatically return to its non-selective position.

To cancel selections once made at the keyboard, it is only necessary for the user to press the keys from beneath to restore them to their initial non-selective positions. Simultaneously with this movement, the companion pawls will be tilted from their latched position with the latch tongues 42 and urged to their retracted position by the springs 39.

We claim as our invention:

1. A selector mechanism for automatic phonographs comprising a selector shaft movable to one or another of a plurality of selective positions and having elements projecting therefrom in different radial planes and in predetermined spaced relation lengthwise of said shaft, a row of vertically-swinging levers alined with the respective shaft-elements and provided above their pivots with depressible selector keys and below their pivots with coupling arms, and stop pawls alined between said levers and the shaft-elements and each operatively connected at one end to its companion lever arm for actuation thereby to bring its opposite end into the path of the companion shaft-element for arresting the rotation of the shaft in selective positions.

2. A selector mechanism for automatic phonographs, comprising a selector shaft movable to one or another of a plurality of selective positions and having elements projecting therefrom in different radial planes and in predetermined spaced relation lengthwise of said shaft, a row of vertically-swinging levers alined with the respective shaft-elements and provided above their pivots with depressible selector keys and below their pivots with coupling arms, stop pawls alined between said levers and the shaft-elements for combined pivotal and linear movement and each operatively connected at one end to its companion lever arm for actuation thereby to bring its opposite end into the path of the companion shaft-elements for arresting the rotation of the shaft in selective positions, said shaft-elements having latching heads thereon engageable with said pawls for releasably retaining them in shaft-arresting positions, and means connected to said pawls for independently urging them normally to a retracted position clear of the path of the selector shaft elements.

3. A selector mechanism for automatic phonographs comprising a selector shaft movable to one or another of a plurality of selective positions and having elements projecting therefrom in different radial planes and in predetermined spaced relation lengthwise of said shaft, a row of depressible selector keys alined with the respective shaft-elements, key-actuated means having latching elements thereon projectable into the path of travel of the shaft-elements in response to selective depressions of the keys for arresting the rotation of said shaft at selective positions, yieldable connections for said key-actuated means for normally retaining them in a retracted, non-selective position clear of said shaft-elements, and means disposed in the operative path of and engageable with the latching elements of said key-actuated means for releasably latching them in a projected selective position.

4. A selector mechanism for automatic phonographs, comprising a selector shaft movable to one or another of a plurality of selective positions and at a predetermined time to a position receded from any given selective position and having elements projecting therefrom in different radial planes and in predetermined spaced relation lengthwise of said shaft, a row of depressible selector keys alined with the respective shaft-elements, key-actuated means projectable into the path of travel of the shaft-elements in response to selective depressions of the keys for arresting the rotation of said shaft at selective positions, yieldable connections for said key-actuated means for normally retaining them in a retracted, non-selective position clear of said shaft-elements, means disposed in operative relation with said key-actuated means for latching them temporarily in a projected selective position until engaged by companion shaft-elements, the engagement of the latter with such key-actuated means acting to release them from said latching means, and complementary latching means at the engaging ends of said shaft elements and said key-actuated means for latching the latter in a projected position upon the release of said first-named latching means, said complementary latching means being released upon a recession of the selector shaft from a given selective position.

5. A selector mechanism for automatic phonographs, comprising a selector shaft movable to one or another of a plurality of selective positions and having elements projecting therefrom in different radial planes and in predetermined spaced relation lengthwise of said shaft, a row of depressible selector keys alined with the respective shaft-elements, key-actuated means projectable into the path of travel of the shaft-elements in response to selective depressions of the keys for arresting the rotation of said shaft at selective positions, yieldable connections for said key-actuated means for normally retaining them in a retracted, non-selective position clear of said shaft-elements, fixed latching members disposed in cooperative relation with said key-actuated means and engageable therewith, when selectively projected, for releasably latching them in such position, and latching heads applied to said shaft-elements and releasably engageable at a predetermined time in the movement of said selector shaft with said key-actuated means latching them thereto and for displacing them from engagement with said fixed latching members.

6. A selector mechanism for automatic phonographs, comprising a selector shaft movable to one or another of a plurality of selective positions and having elements projecting therefrom in different radial planes and in predetermined spaced relation lengthwise of said shaft, a row of depressible selector keys alined with the respective shaft-elements, stop pawls operatively connected to said selector keys for projecting them to a selective position in the path of the companion shaft-elements, each of said pawls having a pair of latch-engaging elements thereon, springs associated with the pawls for constantly urging them to a non-selective position, latch means engageable with one of the latch-engaging elements of said pawls for latching them in a projected position, and latch means applied to said shaft elements and releasably engageable at a predetermined time in the movement of the selector shaft with the companion latch-engaging element of a projected stop pawl.

7. A selector mechanism for automatic phonographs, comprising a selector shaft movable to one or another of a plurality of selective positions and having elements projecting therefrom in different radial planes and in predetermined spaced relation lengthwise of said shaft, a row of depressible selector keys alined with the respective shaft-elements, stop pawls operatively connected to said selector keys for projecting them to a selective position in the path of the companion shaft-elements, each of said pawls having a pair of latch-engaging portions thereon, springs associated with the pawls for constantly urging them to a non-selective position, and latch means engageable with one of the latch-engaging portions of said pawls for latching them in a projected position, said shaft-elements having heads thereon engageable with said pawls at a predetermined time in the shaft movement to release them from said latch means and adapted for engagement with the other of said latch-engaging portions to releasably retain the pawls in projected position.

8. In a selector mechanism for automatic phonographs, a selector-governing shaft having a row of pins projecting radially therefrom, a row of selectively-actuated pawls each having a latch-engaging element thereon and disposed in cooperative relation with said shaft-pins and projectable at will to a selective position in the path of companion pins for arresting the rotation of the shaft at selective positions, springs for normally urging said pawls to a non-selective position, and latch means engageable with said pawls for releasably retaining them in a projected, selective position, said latch means including a bar disposed transversely of said pawls and having tongues rising therefrom engageable with the latch-engaging elements of companion pawls when the latter are projected to a selective position.

9. In a selector mechanism for automatic phonographs, a selector-governing shaft having a row of pins projecting radially therefrom, a row of spring-retracted pawls mounted for independent displacement to and from a projected position in the path of the companion shaft-pins for arresting the rotation of the shaft at selective positions, a row of depressible selector keys disposed in a row parallel to and over the rear ends of said pawls and having operative connections to the rear ends thereof for shifting the pawls to projected selective positions in response to selective depressions of the keys, and means disposed beneath and at the forward ends of said pawls for engagement therewith, when projected, for releasably latching them in a projected position.

10. In a selector mechanism for automatic phonographs, a selector-governing shaft having a row of pins projecting radially therefrom, a row of spring-retracted pawls mounted for a combined pivotal and linear movement to and from a projected position in the path of the companion shaft-pins for arresting the rotation of the shaft at selective positions, a row of depressible selector keys disposed in a row parallel to said pawls and having operative connections thereto for shifting the pawls to projected selective positions in response to selective depressions of the keys, stationary latch means disposed for engagement with said pawls, when projected, for latching them in a pivoted projected position, and latching means applied to said shaft-pins and engageable with said pawls at a predetermined time in the movement of the shaft in one direction for pivoting the pawls in a direction to release them from said stationary latch means and into coupling engagement with said pin-latching means, the latter being releasable from said pawls in response to a movement of said shaft in the opposite direction.

11. In a selector mechanism for automatic phonographs, a selector-governing shaft having a spiral row of headed radial pins thereon corresponding in number to the records, a longitudinal row of selector keys disposed in substantially transverse alinement with said shaft-pins and pivoted for movement to and from a depressed selective position, and displaceable means operatively connected to said keys and alined between the latter and said shaft-pins for projective movement by the keys into the path of the companion pins for governing the selective positions of said shaft, said displaceable means each having a pair of openings therein disposed one in advance of the other, and a bar disposed in adjoining relation to said displaceable means and having latching tongues thereon for latching engagement with one of such displaceable means openings when the companion selector key is depressed, the head of the companion radial pin being adapted for latching engagement with the companion opening.

12. A selector assembly of the character described, comprising a support, a row of pawl-like members mounted for individual movement to and from a selective-governing position, a spring connected to each of said members for normally urging them to a retracted non-selective position, complementary means on said support and the pawl-like members for releasably latching the latter in a projected selective position, and a row of depressible, piano-like selector keys corresponding in number to and disposed in a plane above and in operative relation with said pawl-like members, each of said keys having an operative connection to its companion pawl-like member for actuating it to a projected selective position when such key is depressed and for restoring the depressed key to its initial position when said companion pawl member is released and spring-urged to its retracted position.

FRED H. OSBORNE.
CHARLES J. HULL.